United States Patent [19]

Idzik et al.

[11] Patent Number: 4,577,406

[45] Date of Patent: Mar. 25, 1986

[54] RETRACTING INTERNAL TUBE CUTTER

[75] Inventors: Joseph J. Idzik; Charles H. Kouse, both of Springfield, Ohio

[73] Assignee: Elliott Turbomachinery Co., Inc., Jeannette, Pa.

[21] Appl. No.: 655,118

[22] Filed: Sep. 26, 1984

[51] Int. Cl.⁴ ............................................. B23D 21/14
[52] U.S. Cl. ........................................ 30/103; 82/1.5
[58] Field of Search ................. 30/108, 103, 104; 83/185; 82/1.2, 1.5; 51/341

[56] References Cited

U.S. PATENT DOCUMENTS

| | | | |
|---|---|---|---|
| 1,696,477 | 12/1928 | Hall et al. | 51/341 |
| 2,736,146 | 2/1956 | Brooks | 51/341 |
| 2,805,528 | 9/1957 | Barrett | 51/341 |
| 3,283,405 | 11/1966 | Braswell | 30/103 |
| 3,358,722 | 12/1967 | Berry | 82/1.5 X |
| 3,911,574 | 10/1975 | Jones | 30/103 X |
| 4,307,636 | 12/1981 | Lacey | 82/1.5 |
| 4,466,185 | 8/1984 | Montiero | 30/103 |

Primary Examiner—Frank T. Yost
Attorney, Agent, or Firm—Robert P. Hayter

[57] ABSTRACT

A retracting internal tube cutter for severing a tube from the interior is disclosed. The tube cutter includes a pair of swing arms mounted for pivotal outward displacement for effecting cutting of the tube. A retractor collar biased by a spring is mounted about the swing arms such that the collar maintains the swing arms in an insertion position except when the cutter is rotated. When the cutter is rotated the arms are forced outwardly causing the retractor collar to retract such that the cutter may sever the workpiece where desired. Upon discontinuance of rotation of the tube cutter, the retractor collar is urged into the insertion position withdrawing the cutter arms from the workpiece such that the tube cutter may be removed from the tube.

5 Claims, 3 Drawing Figures

RETRACTING INTERNAL TUBE CUTTER

BACKGROUND OF THE INVENTION

This invention relates to a retracting internal tube cutter for use in severing a tube from the interior of the tube. More particularly the invention concerns a retractable tube cutter having a first position where the cutter blades are secured in a manner allowing insertion and retraction of the tube cutter from the tube and a second cutting position in which the blades may extend to sever the tube.

Utility companies have found it desirable to sever gas mains to buildings at a point adjacent the gas shut-off valve prior to the building being demolished or for other reasons. In order to avoid the expense of digging up the line, it has been found advantageous to insert a tube cutter from the building into the interior of the gas line. The tube cutter is inserted until it is positioned appropriately adjacent the gas valve. At this position the cutter is then operated to sever the gas line. The line may then be removed from the interior of the building or simply left buried in place knowing that it is not connected to the gas supply main.

SUMMARY OF THE INVENTION

It is an object of the present invention to provide a retracting internal tube or pipe cutter.

It is another object of the present invention to provide a pipe cutter which may be inserted within a tube to sever the tube at a desired position.

It is a still further object of the present invention to provide an internal tube pipe cutter having swing arms capable of severing a pipe to be cut.

It is a yet further object of the present invention to provide retraction means for securing the swing arms of the tube cutter in an insertion position wherein the blades are secured to allow the tube cutter to be inserted and/or removed from the pipe.

It is a still further object of the present invention to provide a retractable internal tube cutter wherein the means securing the arms in position is displaced upon rotation of the tube cutter to allow the arms to effectively cut the tube.

It is a yet further object of the present invention to provide a safe, economical, reliable and easy to use retractable internal tube cutter.

Other objects of the present invention will be apparent from the description to follow and the appended claims.

These and other objects of the present invention are achieved according to a preferred embodiment by the provision of a retracting internal tube cutter which includes a tube cutter body having pivotable mounting means and means through which said body may be caused to rotate. At least two swing arms are pivotably mounted to the pivotable mounting means such that upon rotation of the body the swing arms are forced outwardly. Cutter blades are mounted on the ends of the swing arms to extend outwardly to effect cutting. A retraction means is provided to engage the swing arms to prevent the swing arms from extending outwardly except when the cutter is being rotated including being displaced upon the discontinuance of rotation of the cutter to recenter the swing arms in the insertion position.

Additionally disclosed is a retractable internal tube cutter which includes a tube cutter body having a large diameter mounting portion defining a slot and a smaller diameter body extension. A pair of cutter arms having one end pivotally secured within the slot of the mounting portion of the tube cutter body and each have a cutter blade mounted to the end of the cutter arm distant from the end pivotally secured are provided. A slidable annular retractor is positioned to encase the mounting portion of the tube cutter body and the pivotally secured end of the cutter arms. Biasing means are provided for urging the retractor to a first position encasing the cutter arms to prevent them from pivoting to a cutting position, said biasing means allowing the retractor to be displaced to a second position upon rotation of the cutter to allow the cutter arms to be displaced outwardly to engage the tube to be cut.

DESCRIPTION OF THE PREFERRED EMBODIMENT

The apparatus as set forth herein is designed for use in cutting gas mains servicing buildings. It is to be understood that this internal tube cutter has numerous other applications wherein it is desired to effect the cutting of a pipe from an interior position. It is also to be understood that although specific means are shown for accomplishing certain functions that other equivalent apparatus could be utilized to perform same. Additionally, although not specifically shown, it is anticipated that this cutter would be operated by rotating it at high speeds such as 2,000 or higher revolutions per minute. A flexible shaft encased in a sheath is the preferred apparatus for effecting such rotation, said shaft may be connected to any motive means capable of rotating it at the desired speed. Of course, other motive sources could serve equally well such as providing an air motor located adjacent the cutter itself and supplying air under pressure thereto.

Figure 1:
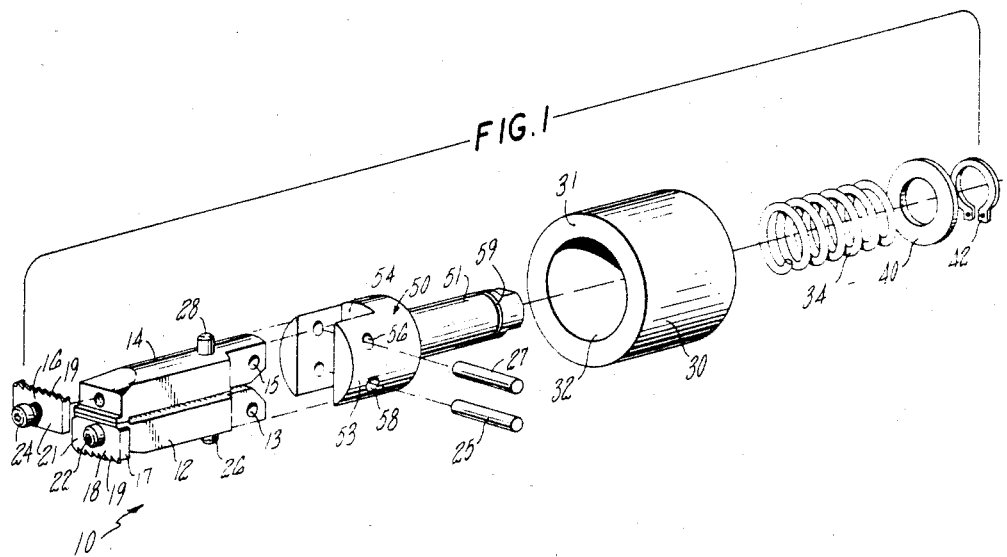
FIG. 1 is an exploded view of a retracting internal tube cutter.

FIG. 1 is an exploded perspective view of the tube cutter. It can be seen that body 50 includes reduced diameter body extension 51 and a larger diameter mounting portion 53. In the mounting portion 53 is defined an arm receiving slot 54 and pin receiving openings 56 and 58. Pivot pins 25 and 27 are shown positioned ready to be inserted within pin receiving openings 56 and 58. Slot 59 is shown extending circumferentially about body extension 51 for the receipt of snap ring 42. Additionally, shaft opening 52 is shown in the body for receiving the flexible shaft for effecting rotation of the body.

Swing arms 12 and 14 are shown in position to be inserted within slot 54. The swing arms define pivot openings 13 and 15 respectively through which pivot pins 25 and 27 may be inserted such that the cutter arms are pivotally mounted within the slot 54. The cutter arms additionally have retractor pins 26 and 28 extending outwardly therefrom adjacent the pivot end of the cutter arms. Cutter blades 18 and 16 are mounted at the opposite end of the cutter arm. Each blade includes a pair of cutter flanges 17 extending at a sharp angle to cutter body portion 21 of the cutter blade which is parallel to the end face of the swing arm. The cutter flanges extend along the side of the swing arm maintaining the cutter blade in position. Screws 22 and 24 are inserted into the appropriate swing arms to maintain the cutter blades in position. Cutter teeth 19 are shown extending outwardly from the cutter blade.

Retractor collar 30 is annular in configuration and designed to slide over the mounting portion of body 50 such that arm containing space 32 encases mounting portion 53 and the pivotal end of the two swing arms secured therewithin. Body opening 33 in retractor collar 30 is sized to fit over the body extension portion of the body such that the retractor collar is slidable along the body. Spring 34 is positioned on the body extension between the retractor collar and retractor washer 40. Retractor washer 40 is maintained in position via snap ring 42 secured within slot 59 of the body extension.

Figure 3:
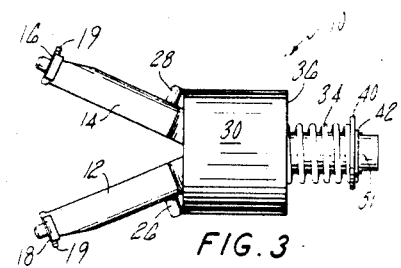
FIG. 3 is a view of the internal tube cutter shown in the cutting position.
Figure 2:
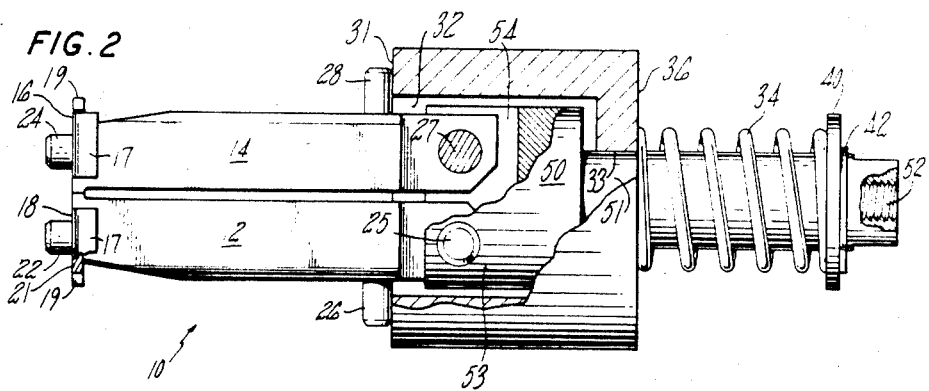
FIG. 2 is a sectional view of an internal tube cutter shown in the insertion position.

Referring specifically to FIGS. 2 and 3 the relationships between the various components assembled along the tube body may be more clearly seen. Therein it can be seen the snap ring 42 is secured within slot 59 and engages retractor washer 40 to prevent displacement to the right of the retractor washer. Spring 34 is secured between the retractor collar 30 and retractor washer 40 to bias the retractor collar in the left direction as shown in FIG. 2. Additionally it can be seen that the swing arms in FIG. 2 are maintained in the insertion position wherein the arms are generally parallel and extend directly in front of the body such that they are in a position not to engage the side walls of the tube as the tube cutter is either inserted or removed from the tube to be cut.

It can also be seen in FIG. 2 that the spring has urged retractor collar 30 to the left until abutment face 31 of retractor collar 30 engages retractor pins 26 and 28 limiting further motion of the retractor collar to the left. The spring engages spring face 36 of the retractor collar to exert this force. Hence via the force applied by the spring, the retractor collar is urged to the left and the spring arms are maintained in the insertion position.

Referring now to FIG. 3 the tube cutter is shown in the cutting position. In this position the cutter is being rotated at a high rate of speed such that force is created to displace the swing arms outwardly. As the force is created the arms are displaced outwardly until they engage the workpiece to be cut and effect severance of the tube at the desired location. As the swing arms are displaced outwardly the arm engages the abutment face of retractor collar and urges the retractor collar to the right compressing spring 34. The outwardly acting forces on the spring arms cause the retractor collar to be sufficiently displaced that the swing arms extend outwardly to the point where the workpiece may be severed.

To effect operation of this internal tube cutter the body would be mounted to a flexible shaft and inserted into a tube to be cut. A stop of some type would be utilized on the shaft to position the cutter at the appropriate depth into the pipe. The cutter is not rotated during insertion such that the retractor collar is maintained in the insertion position as shown in FIG. 2 to maintain the swing arms centered to prevent any obstruction during the insertion of the cutter.

Once the cutter is inserted to the desired position it is rotated at a high rate of speed. As shown in FIG. 3 the swing arms extend outwardly and the cutter is rotated until the pipe is severed as desired. Once severed the cutter is no longer rotated and the retractor collar is urged to the left by spring 34 until the swing arms are repositioned in the center as shown in FIG. 2 in the insertion position. Once the arms are in the insertion position the entire tube cutter may be easily removed from the tube by simply pulling the flexible shaft with the attached cutter from the tube. The spring acts to displace the retractor collar which compresses the swing arms to disengage the cutter blades from the surface being cut thereby allowing the entire assembly to be withdrawn from the tube.

The invention has been described herein with reference to a particular embodiment. It is to be understood by those skilled in the art that variations and modifications can be effected within the spirit and scope of the invention.

We claim:

1. A retracting internal tube cutter which comprises:
    a tube cutter body including pivotable mounting means and means through which said body may be caused to rotate;
    at least two swing arms pivotably mounted to the pivotable mounting means such that upon rotation of the body the swing arms are forced outwardly;
    cutter blades mounted on the ends of the swing arm to extend outwardly to effect cutting;
    a retractor mounted to selectively engage the swing arms to prevent the swing arms from extending outwardly except when desired;
    said retraction means including a spring biased slidable retractor which has a first at rest position encasing a portion of the swing arms to prevent outward displacement of the swing arms and a second retraction position wherein the retractor has been slidably displaced to allow outward displacement of the swing arms;
    said tube body including a mounting portion defining a slot in which the swing arms are pivotally mounted and the retractor is annular in configuration and defines an arm containing space which is sized to slide over the mounting portion of the tube body and the swing arms mounted therein; and
    wherein the retractor defines a body opening through which an extension portion of the body extends and includes a spring mounted about the body extension and engaging the retractor; a retractor washer mounted to the body extension a distance from the retractor for engaging the spring; and a snap ring, securing the washer in position, wherein said spring biases the retractor away from the retractor washer to encase the swing arms for preventing outward displacement and wherein upon rotation of the tube cutter the swing arms are forced outwardly displacing the retractor and compressing the retractor spring to allow the swing arms to engage a workpiece.

2. The apparatus as set forth in claim 1 wherein each cutter blade further comprises:
    a cutter body including cutter teeth mounted to the end of a swing arm; and
    at least one cutter flange sharply angled from the cutter body and extending along a portion of the swing arm to position the cutter.

3. A retractable internal tube cutter which comprises:
    a tube cutter body having a large diameter mounting portion defining a slot and a smaller diameter body extension;

a pair of cutter arms having one end pivotally secured within the slot of the mounting portion of the tube cutter body;

a cutter blade mounted to the end of each cutter arm distant from the end pivotally secured;

a slidable annular retractor positioned to encase the mounting portion of the tube cutter body and the pivotally secured end of the cutter arms; and biasing means for urging the retractor to a first position encasing the cutter arms to prevent them from pivoting to a cutting position, said biasing means allowing the retractor to be displaced to a second position upon rotation of the cutter to allow the cutter arms to be displaced outwardly to engage the tube to be cut.

4. The apparatus as set forth in claim 3 and further comprising:

the cutter body, when rotating, acting to rotate the cutter arms such that the arms pivot outwardly to engage the tube to be cut and act to displace the retractor against the biasing means.

5. The apparatus as set forth in claim 4 wherein the biasing means is a spring positioned about the body extension engaging the retractor and wherein the cutter arms further comprise a retractor pin positioned to limit displacement of the retractor over the arms.

* * * * *